Oct. 1, 1963   J. L. WIEGARDT, JR   3,105,461
TREATMENT OF TIDE LANDS TO RECLAIM
SHRIMP-INFESTED OYSTER GROUNDS
Filed May 24, 1962

INVENTOR.
JOHN L. WIEGARDT, JR.

BY
*Parker & Seed*

ATTORNEYS

United States Patent Office 3,105,461
Patented Oct. 1, 1963

3,105,461
TREATMENT OF TIDE LANDS TO RECLAIM SHRIMP-INFESTED OYSTER GROUNDS
John L. Wiegardt, Jr., Box 236, Ocean Park, Wash.
Filed May 24, 1962, Ser. No. 197,410
10 Claims. (Cl. 119—4)

This invention relates to a means and method for treating tide lands which have become heavily infested with burrowing shrimp and by such infestation made unfit for the profitable raising of oysters. Profitable fattening of oysters demands that the tide lands be covered by a heavy layer of silt. The silt covers the sand and protects young oysters from liability of becoming buried by shifting sands, and additionally stores food substance upon which the oysters fatten. Burrowing shrimp displace the silt, baring the sand, and also sour the ground by semi-toxic pollutants.

It has been my finding that very nearly all tide grounds so unproductive as to be in the classification of marginal and sub-marginal lands are heavily infested with burrowing shrimp and that the ground, upon removal of such shrimp, will quickly return to a condition suitable for rapid fattening of oysters.

In my previous efforts to eradicate the shrimp, this being the process described in my pending application for patent filed June 30, 1960, Ser. No. 39,833, now Patent No. 3,062,182, I operated on the theory that the ground should be plowed or otherwise opened up in order to break up the burrows. The displaced shrimp come to the surface, and are eliminated by sea gulls. Both prior to and following the plowing step heavy rollers are pulled over the ground.

It has been determined through experimentation that the step which is most important in my said prior method is the final rolling. Many shrimp remain covered after the plowing step and if permitted to breathe quickly reestablish themselves. The final rolling levels the ground and in addition serves the more important end of producing a crust which suffocates the shrimp by sealing off the burrows.

Heretofore, I have looked to the plowing as the most effective means of eliminating the shrimp. Plowing is time-consuming and I have now established that this procedure can be dispensed with and the shrimp decimated simply by suffocation. For effective suffocation there is one major problem which must be overcome, and that is "boils" in the sand caused by water being forced up through the crust under pressure of the rolling and, to a certain extent, by a pumping action of the shrimp themselves. The "boils" keep the burrows open and where the condition obtains a considerable number of shrimp will survive. The degree to which the treated land returns to maximum productivity is reduced in correspondence with the residue of live shrimp which remain after the ground has been treated.

According to the present invention the tide lands are worked by a succession of three rolling actions. The rollers are drawn behind tractors, and those first employed are or may be conventional rollers of fairly light weight and are preferably used in tandem, one roller behind another coupled by a tow-chain. The purpose of these rollers is to wring out and thus firm up the top layer of ground, giving a surface which will bear the weight of heavier following equipment. Without this initial treatment, the horsepower requirements for simply moving a heavy tractor preclude the tractor from pulling any load of appreciable weight.

The devices with which the second wave of rolling is performed are used after the ground begins to set up, usually three or four minutes. These second-wave rollers have as their function to transmit through the ground to the shrimp a shock force of considerable intensity. I have designed for this purpose a chopper-type roller presenting about the periphery a succession of circumferentially spaced feet on which the roller "walks." As the roller turns these feet create a terrific thumping action which has the effect of numbing the shrimp. The dormant, spent condition of shrimp dug from the ground after the humping roller has made a pass establish beyond question that this numbing result is accomplished.

At this stage, there remains in the sand a multitude of "boils," through which many of the shrimp rise to the surface—evidencing however little or no life—and these are devoured by the sea gulls. My third-wave rollers, designed to close off these "boils," are comprised of a gang arrangement of individually suspended ground-rolling wheels. I prefer to draw both the second-wave and the third-wave rollers behind a rubber-tired tractor weighted with a bull-dozer blade, imposing on the wheels an approximate 20-ton weight. This type of tractor, distinguished from the much lighter "half-tracks" with which I prefer to tow the first-wave rollers, operates in and of itself as a roller. The wheels of the gang roller have an over-all width approximating the span between the traction wheels of the tractor so as to substantially fit this gap in point of coverage. It is found desirable to make two passes with the gang rollers, one pass overlapping the other by approximately 50%.

There is a very noticeable difference in the results obtained as between a solid roller such as I use in my first-wave treatment and that of the third-wave gang rollers. The solid roller appears to stretch the ground, pushing water ahead in an underground wave while setting up a vacuum condition to the rear. The wave action from the gang rollers is much less pronounced in that the wave is broken up in the gaps which lie between the wheels. I attribute my final ground seal to the fact that squeezed underground water can form pockets below the surface crust in the gaps between the wheels, rather than boiling to the surface.

In the accompanying drawing, wherein I have illustrated second-wave and third-wave rollers constructed to embody the preferred teachings of the present invention:

Figure 1:
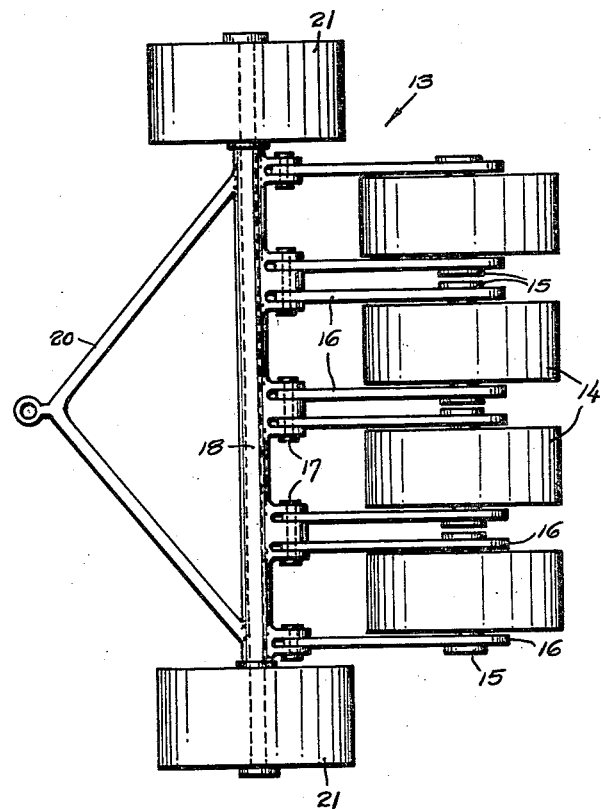
FIGURE 1 is a top plan view of the gang rollers used in the third-wave action.
Figure 2:
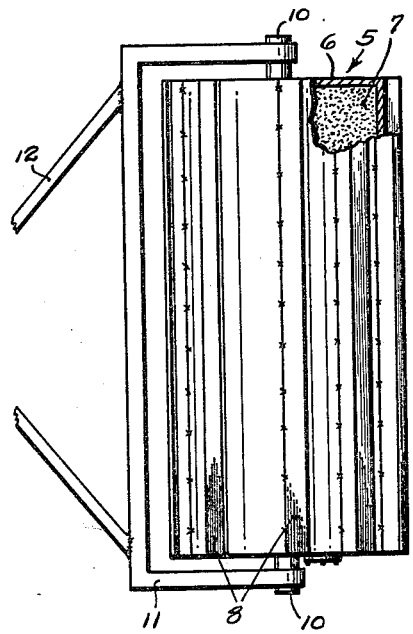
FIG. 2 is a top plan view of the walking-type roller used in the second-wave action, the roller proper being broken away and shown partly in horizontal section, and the draw-bar therefor being shown framentarily.
Figure 3:
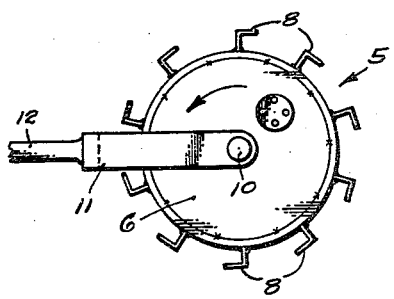
FIG. 3 is a fragmentary side elevational view of said walking-type chopper roller of FIG. 2.

Referring to said drawing, the chopper roller is designated generally by the numeral 5 and desirably comprises a hollow cylindrical tank 6 filled with sand 7 and having its chopper feet 8 composed of lengths of angle-iron which run the length of the tank and are welded thereto. Dimensionally considered, a tank 3 feet in diameter and 5½ feet in length, with 4 x 4 angle-iron spaced at intervals of 11", is suitable. The tank has trunnion shafts 10 welded to the end walls and these trunnion shafts are journaled in the arms of a yoke 11 to which a draw-bar 12 is welded.

The gang roller is designated generally by 13. The individual wheels 14, here shown as four in number, have trunnion shafts 15 journaled in the free after ends of paired sets of draft arms 16 having their front ends individually pivoted, as at 17, to a towing axle 18 to which a draw-bar 20 is welded. Each end of the towing axle is supported by a respective one of two tires 21. The wheels and tires are filled with concrete. Dimensionally considered the ganged wheels are or may have a width of 15" and a diameter of 3'. While illustrated as somewhat wider the preferred spacing is 4". The tires 21 desirably have a tread wider than that of the roller wheels 14.

With the equipment and process described I have found it possible to average 10 acres of ground per day. With the plowing-rolling procedure described in my above-identified pending patent application I have averaged only about 1½ acres per day.

It should perhaps be here noted that I have performed some experimental work with a vibrating tamper in the hope that the same might accomplish in a single pass the results which I now obtain from the described second-wave and third-wave rollers, namely shocking the shrimp and at the same time putting sufficient pressure on the ground, at separated intervals, to produce a ground seal with little or no occurrence of "boils." Findings from these preliminary tests indicate that the vibrating technique is entirely feasible.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

What I claim is:

1. The method of reclaiming tide-land oyster grounds infested with burrowing shrimp, comprising creating by impaction of a surface portion of the tide-lands a force potential sufficient to numb shrimp occupying burrows therebelow.

2. The method of reclaiming oyster grounds infested with burrowing shrimp, comprising first rolling the grounds to firm up the surface and then subjecting said surface to impaction force of an intensity sufficient to numb shrimp occupying burrows therebelow.

3. The method of reclaiming oyster grounds infested with burrowing shrimp, comprising first rolling the ground to firm up the surface, then subjecting said surface to impaction force of an intensity sufficient to numb shrimp occupying burrows therebelow, and again rolling the ground with said final rolling performed in a manner producing narrow strips of compacted ground separated by narrow ground strips free of the compacting pressure.

4. The method of reclaiming shrimp-infested oyster ground which comprises subjecting the surface of the ground to a succession of impaction blows delivered with an intensity sufficient to numb shrimp occupying burrows therebelow.

5. The method of reclaiming shrimp-infested oyster ground which comprises subjecting the surface of the ground to a succession of impaction blows delivered with an intensity sufficient to numb shrimp occupying burrows therebelow, and then rolling said ground surface under a heavily weighted load.

6. The method of reclaiming shrimp-infested oyster ground which comprises subjecting the surface of the ground to a succession of impaction blows delivered with an intensity sufficient to numb shrimp occupying burrows therebelow, and then rolling closely spaced paralleling strips of said ground surface under heavily weighted loads.

7. The method of reclaiming shrimp-infested oyster ground which comprises subjecting the surface of the ground to a succession of impaction blows delivered with an intensity sufficient to numb shrimp occupying burrows therebelow, and then sealing off the burrows by establishing a surface crust largely free of "boils."

8. The method of reclaiming shrimp-infested oyster ground which comprises subjecting the surface of the ground to a succession of impaction blows delivered with an intensity sufficient to numb shrimp occupying burrows therebelow, and then sealing off the burrows by establishing a surface crust of heavily compacted ground strips separated by narrow intervening strips free of the compacting pressure so as to give relief to "boils" developing under force of said compaction.

9. The method of reclaiming oyster ground infested with burrowing shrimp comprising a three-stage rolling treatment in the first stage of which the ground to be treated is firmed up, in the second stage of which the firmed ground is subjected to a succession of impact blows transmitting shock force to shrimp occupying burrows therebelow, and in the third stage of which the impacted ground is compacted to form a crust sealing the burrows.

10. The method of claim 9 characterized in that the third-stage rolling pressure is imposed only upon narrow closely spaced strips of ground thus freeing the intervening strips from the compacting force so as to give relief to "boils" developing under force of the compaction.

No references cited.